US005818185A

United States Patent [19]
Freitag et al.

[11] Patent Number: 5,818,185
[45] Date of Patent: Oct. 6, 1998

[54] PROCESS AND DEVICE FOR MONITORING AND CONTROLLING THE SPEED OF ROTATION OF AN ELECTRIC DRIVE WITH FREQUENCY CONVERTER FOR HOISTING GEARS

[75] Inventors: Holger Freitag, Bochum; Anton Münzebrock, Dortmund, both of Germany

[73] Assignee: Mannesmann Aktiengesellschaft, Düsseldorf, Germany

[21] Appl. No.: 547,986

[22] Filed: Oct. 25, 1995

[30] Foreign Application Priority Data

Nov. 7, 1994 [DE] Germany .......................... 44 40 420.4

[51] Int. Cl.[6] ........................................................ H02P 7/00

[52] U.S. Cl. .......................... 318/432; 318/743; 318/759; 318/802; 318/376

[58] Field of Search .................................... 318/739–744, 318/757, 759, 800–803, 807–811, 434, 432, 373, 375, 376

[56] References Cited

U.S. PATENT DOCUMENTS

| | | | |
|---|---|---|---|
| 4,145,645 | 3/1979 | Price et al. | 318/762 |
| 4,272,706 | 6/1981 | Somerville | 318/802 X |
| 4,278,150 | 7/1981 | Wehrli, III et al. | 187/29 R |
| 4,402,387 | 9/1983 | Tsuji et al. | 187/293 |
| 4,501,343 | 2/1985 | Salihi | 187/296 |
| 5,167,400 | 12/1992 | Gazel-Anthoine | 254/275 |
| 5,361,565 | 11/1994 | Bayer | 318/49 X |
| 5,373,121 | 12/1994 | Nagel | 187/275 |

FOREIGN PATENT DOCUMENTS

| | | |
|---|---|---|
| 03 47 408 | 12/1989 | European Pat. Off. . |
| 17 81 123 | 4/1971 | Germany . |
| 52-11 8752 | 10/1977 | Japan . |

*Primary Examiner*—Brian Sircus
*Attorney, Agent, or Firm*—Cohen, Pontani, Lieberman, Pavane

[57] ABSTRACT

A process and a device for monitoring and/or controlling the speed of rotation of an electric drive having an asynchronous motor equipped with a braking device (11) and connected via a frequency adapter (13) to an alternating current system (12), e.g. three-phase system, to provide safe lifting and lowering of a load. The maximum torque (16) produced by the drive for lifting the load is set to be smaller than a holding torque (17) needed by the braking device (11) to hold the load in a stationary position.

9 Claims, 2 Drawing Sheets

PROCESS AND DEVICE FOR MONITORING AND CONTROLLING THE SPEED OF ROTATION OF AN ELECTRIC DRIVE WITH FREQUENCY CONVERTER FOR HOISTING GEARS

BACKGROUND OF THE INVENTION

1. Field of the Invention

The present invention relates to a process and device for monitoring and controlling the speed of rotation of an electric drive and, more particularly, to a process and device for monitoring and controlling an electric drive used in lifting and lowering a load having an asynchronous motor equipped with a braking device connected to an alternating current (a.c.), system such as a three-phase system, via a frequency converter.

2. Description of the Prior Art

Hoisting mechanisms and electric drives are well-known and generally driven by inexpensive, maintenance-free three-phase asynchronous motors. Asynchronous motors operate in a three-phase system based upon a power-line frequency of, for instance, 50 Hertz in principle with a fixed rated speed of rotation from which only slight deviations are possible. In order to change the speed of rotation of the motor in a controlled fashion, frequency converters are inserted between the three-phase system and the asynchronous motor.

Hoisting gears or hoists must be constructed and dimensioned for reliable operation and protection against dangerous movements of the load to prevent injury to persons and property. In particular, it must be possible to brake the movement of the load using a motor and brake and to hold the hanging load.

European Patent No. EP 0 347 408 B 1 discloses the present state of the art in which frequency-dependent speeds of rotation can be established by weakening the field via a frequency converter so that heavy loads can be lifted at a slower speed and lighter loads at a greater speed. However, this invention fails to account for the fact that in an electric drive for lifting and lowering a load not only the lifting process but also the lowering process are of great importance with respect to safety.

It is therefore desirable to provide a process and device which assures the safe operation of an electric drive consisting of an asynchronous motor having a braking device for both lifting and lowering a load connected to an alternating current system, e.g. a three-phase system, via a frequency converter.

SUMMARY OF THE INVENTION

It is thus an object of the present invention to provide a process and device in which the maximum torque produced by the drive for lifting a load is less than a holding torque of the braking device. In this way, an impermissibly large and rapid descent of the load which could endanger both the load and the operator is avoided throughout the lifting of the load.

A further object of the present invention is to provide a process and device in which an available braking torque is greater than the maximum motor torque necessary for lowering the maximum load at a rated speed to decelerate the lifted load to a standstill within a permissible period of time. In this way, additional protection for an impermissible or unsafe acceleration of the load during lowering is obtained.

Furthermore, the present invention determines a maximum permissible frequency for exceeding the rated speed for lifted loads weighing less than the maximum allowable load. Thus the capacity of the motor is advantageously used within a permitted range to provide safe braking.

In the present invention a speed of rotation control determines the maximum permissible frequency for the suspended load by comparing the actual speed of rotation of the motor with the desired speed value at a time when a subsequent contact of a control station is actuated which, by a first contact, commences the lifting movement and, by its subsequent contact, starts the comparison process. Thus, permissible speed limit values or frequencies can be determined as a function of the load at the start of the lifting process to provide increased safety.

In determining the maximum permissible frequency, the desired frequency value for an electric-drive type point is determined and the deviation of the speed of rotation from the rated or nominal speed associated with the desired frequency value is measured whereby a correspondingly larger frequency is provided by the frequency adapter when the nominal or rated value of the motor speed exceeds the speed of rotation. In this way, the motor is advantageously utilized to capacity by increasing the speed of rotation. The electric-drive type point is also advantageously utilized as the behavior at this point is substantially linear providing a reproducible process through use of an asynchronous motor.

In accordance with further features of the present invention, the speed of rotation control device continuously monitors the deviation between the speed of rotation and the speed associated with the limit value typical of the motor during the lifting movements and, upon determining the actual speed has exceeded the speed associated with the limit value, the braking device is activated to provide emergency holding of the load. This provides loading of the hoisting gear which was not considered in prior art devices in addition to increased safety.

The present invention also provides for a continuously variable control of the desired frequency value between actuation of the first contact of the control station and actuation of the subsequent contact through the generation of an additional control signal by the control station. Thus, the operator can directly control the speed via the control station.

An analog control signal, such as an electric voltage, can be used as the additional control signal. Such an analog system can be advantageously handled from the standpoint of control technique.

Furthermore, the magnitude of the analog signal at the time of actuation of the first contact defines a minimum speed of rotation and the magnitude of the analog signal at the time of actuation of the subsequent contact defines the maximum permissible speed of rotation for lifting or lowering the respective load. Thus, all desired values of speed or frequency within the permissible range are provided by the analog signal. These measures provide optimal utilization of the actuating path of the control station and the greatest possible precision or resolution.

The present invention provides a speed-of-rotation control device connected to a tachometer measuring the speed of rotation of the asynchronous motor and a control station for controlling the direction and speed of lifting movement. The speed of rotation control device is connected to the frequency adapter and the brake device, in which connection the speed of rotation control device detects the actual speed of the asynchronous motor, the direction of rotation of the asynchronous motor and the control command from the control station for a desired lifting movement, and generates a desired frequency value to be provided by the frequency adapter and a maximum permissible desired frequency value. The speed-of-rotation control device advantageously limits the desired frequency value provided by the frequency adapter to the maximum permissible frequency value.

The process and the apparatus will be described in further detail with reference to the embodiment of the invention shown in the drawings.

The various features of novelty which characterize the invention are pointed out with particularity in the claims annexed to and forming a part of the disclosure. For a better understanding of the invention, its operating advantages, and specific objects attained by its use, reference should be had to the drawings and descriptive matter in which there are illustrated and described preferred embodiments of the invention.

DETAILED DESCRIPTION OF THE PREFERRED EMBODIMENT

Figure 1:
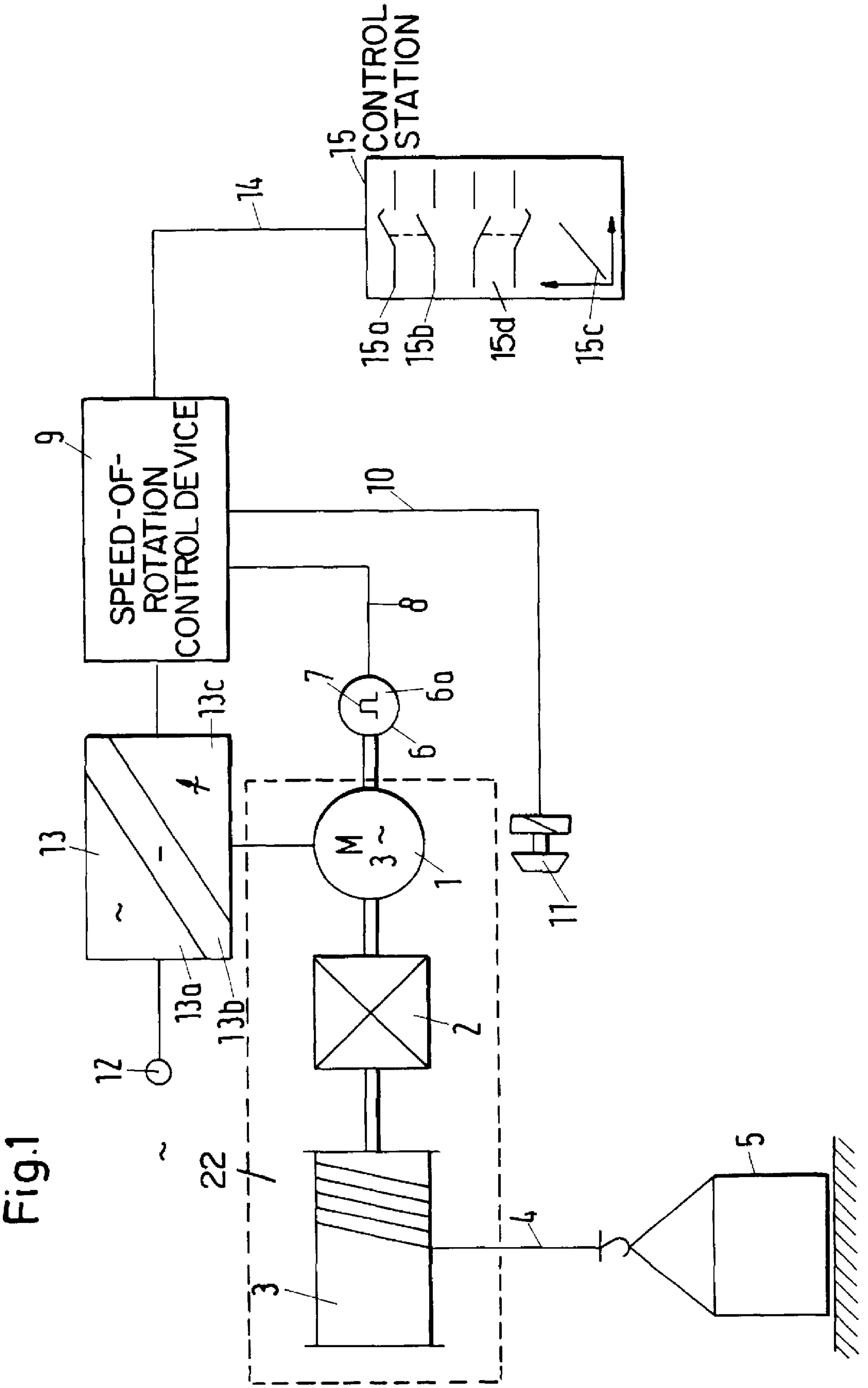
FIG. 1 is a block diagram of a device for monitoring and controlling a speed of rotation of an electric drive in accordance with the present invention.

FIG. 1 shows an asynchronous motor 1 which either drives or brakes a cable drum 3 suspending a load 5 on a cable 4 via a transmission device 2.

The asynchronous motor 1 is connected to a pulse generator 6 including a tachometer 6*a*; the electrical signals or pulses 7 generated by the pulse generator 6 correspond to the speed-of-rotation "n" of the motor and are delivered to a speed-of-rotation control device 9 through a first control line 8. A brake device 11 for the asynchronous motor 1 is connected to the speed-of-rotation control device 9 via a second control line 10. An alternating current (a.c.) system 12, e.g. a three-phase system, is connected to the speed-of-rotation control device 9 through a frequency adapter 13 including an alternating voltage part 13*a*, a direct voltage part 13*b*, and a frequency changer part 13*c*. A manually operated control station 15 is connected to the speed-of-rotation control device 9 via a control cable 14. Within the control station 15 are switches, one switch 15*a* to raise the load 5 a second switch 15*b* to lower the load 5 and a third subsequent contact switch 15*d* and a circuit 15*c* for changing a voltage supplied by the control station 15.

The brake device 11 has an electrically releasable brake. In asynchronous motors having sliding rotors the electrical release of the brake takes place upon connecting or application of the motor terminal voltage.

The control station 15 controls the direction and speed of lifting movement and is connected, via the control cable 14 and the speed-of-rotation control device 9, to both the frequency adapter 13 and the brake device 11. The speed-of-rotation control device 9 detects the actual speed of rotation of the motor 1, the direction of rotation of the asynchronous motor 1 and the control command of the control station 15 indicating a desired lifting movement. The speed-of-rotation control device 9 determines a desired frequency value for the frequency adapter 13 and, a maximum permissible desired frequency value from the detected values.

Figure 2:
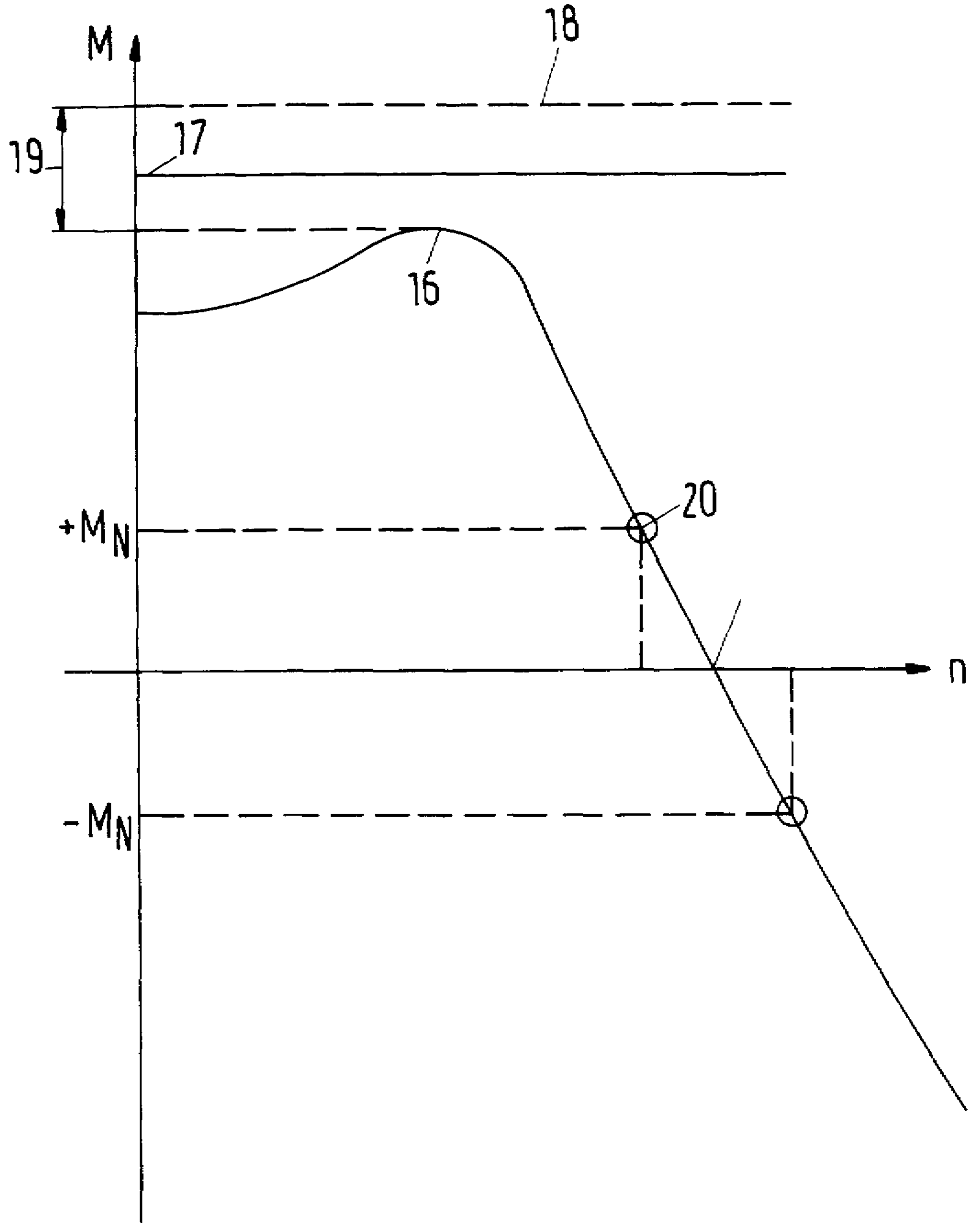
FIG. 2 is a graphical representation of the speed of rotation versus the torque of the asynchronous motor.

The monitoring and control of the speed of rotation of an electric drive 22 consisting of the asynchronous motor 1, transmission 2 and cable drum 3, the asynchronous motor 1 being connected via the frequency adapter 13 to the a.c. system 12, is performed through control of the brake device 11 acting on the asynchronous motor 1. As is depicted in FIG. 2, the maximum torque 16 for the electric drive 22 to lift the load 5 is set at an amount less than a holding torque 17. The asynchronous motor 1, when connected to the frequency adapter 13 in this manner, acts as a lift drive having variable speed lifting gears which are developed and monitored for different loads whereby the maximum speed of rotation for different size loads is limited to a value less than the available braking torque 18 to prevent dangerous movement of the load and dependably hold lifted loads. The load is therefore always dependably held upon reversal of the rotation direction.

In this connection, the available braking torque 18 must be larger than the maximum motor torque 16 necessary upon lowering the maximum load at the rated speed by an amount 19 in order to decelerate the lifted load 5 until it comes to rest in a permissible period of time and thus safely brake the load.

For lifted loads 5, a maximum permissible frequency for exceeding the rated speed is also determined for loads less than the maximum load.

The speed-of-rotation control device 9 determines the maximum permissible frequency for lifting or lowering the suspended load 5 by comparing the actual speed of rotation with the issued desired frequency value at a time when a subsequent contact 15*d* of the control station 15 is actuated. The control station 15, by a first contact 15*a*, starts the lifting movement and by its subsequent contact 15*d* starts the comparison process.

In order to determine the maximum permissible frequency, the desired frequency value for an electric-drive type point 20 (maximum permissible load=rated torque) is predetermined as the point at which the behavior is practically linear. Thereupon the deviation in the actual speed of rotation from the rated or nominal value for the speed of rotation for the motor is measured and a corresponding larger maximum frequency is issued if the speed of rotation is less than the rated value.

The speed-of-rotation control device 9 constantly monitors the deviation between the actual speed of rotation and desired speed for the electric-drive-type limit value during the lifting movements and activates the brake device 11 as an emergency holding device when it is determined the actual speed-of-rotation has exceeded the limit value.

For a continuously variable control of the desired frequency value between the first contacts of the control station 15 and the actuating of the subsequent contact, an additional control signal can be given by the control station 15. An analog signal such as an electrical voltage may be used as the additional control signal.

The magnitude of the analog signal at the time of the actuation of a first contact defines the minimum speed of rotation and the magnitude of the analog signal at the time of actuating the subsequent contact defines the maximum permissible speed of rotation or frequency at the time. All desired values for the speed of rotation and frequency are established within the permissible range using the analog signal.

The invention is not limited by the embodiments described above which are presented as examples only but can be modified in various ways within the scope of protection defined by the appended patent claims.

We claim:

1. A process of monitoring and controlling a speed of rotation of an electric drive used to lift and lower a load, the electric drive including an asynchronous motor having a rated speed and a braking device generating a holding torque and connected to an alternating current system through a frequency adapter, comprising the steps of:

rotating the asynchronous motor to generate a first torque and impart a lifting motion to the load;

adjusting the first torque to have a magnitude less than a magnitude of the holding torque;

introducing lifting motion to the load by actuation of a first contact in a control station; and actuating a subsequent contact in the control station for measuring an actual speed of rotation of the electric drive and comparing, in a speed-of-rotation control device, the actual speed of rotation and a desired speed value to determine a maximum permissible frequency to be provided by the frequency adapter to the asynchronous motor for lifting the load with a speed corresponding to a determined maximum permissible speed of rotation for the asynchronous motor above the rated speed upon lifting a load smaller than a maximum permissible load.

2. The process of claim 1, further comprising the steps of:

rotating the asynchronous motor to generate a second torque and impart a lowering motion at a rated speed to the load; and generating a braking torque by the braking device to decelerate the rated speed of the load, the braking torque having a magnitude greater than a magnitude of the second torque by an amount large enough to decelerate the rated speed to zero within a predetermined permissible period of time.

3. The process of claim 1, further comprising the steps of:

constantly comparing the measured actual speed of rotation and a predetermined desired frequency value for an electric-drive-type point defining a limit value to determine if the actual speed exceeds the limit value; and increasing a frequency provided by the frequency adapter to the asynchronous motor upon determining the actual speed is less than the limit value.

4. The process of claim 3, further comprising the step of activating the braking device upon determining the actual speed exceeds the limit value.

5. The process of claim 4, further comprising the step of applying a variable control signal from said control station to said speed-of-rotation control device for varying said desired frequency value.

6. The process of claim 5, wherein the step of applying applies an analog signal as the varying control signal.

7. The process of claim 6, wherein the step of applying applies an electric voltage as the analog signal.

8. The process of claim 5, wherein said step of applying includes the steps of:

defining a minimum speed of rotation upon application of the varying control signal and activation of the first contact; and defining a maximum speed of rotation upon activation of the subsequent contact, so that the actual speed of rotation is within a range defined by the minimum and maximum speeds.

9. An apparatus for monitoring and controlling a speed of rotation of an asynchronous motor including a braking device and being driven by an alternating current system via a frequency adapter to lift and lower a load, the apparatus comprising:

a tachometer connected to the asynchronous motor for measuring the speed of rotation of the asynchronous motor; and a speed of rotation control device connected to the frequency adapter and braking device including a control station for generating a signal for controlling a direction and speed of rotation of the asynchronous motor, the speed of rotation control device for generating a desired frequency value and maximum permissible frequency value based upon the speed of rotation signal received from said tachometer and the control signal received from said control station and controlling a frequency provided by said frequency adapter to said asynchronous motor based upon the generated desired frequency value and maximum permissible desired frequency value.

* * * * *